United States Patent
Genzer et al.

(12)

(10) Patent No.: US 6,423,372 B1
(45) Date of Patent: Jul. 23, 2002

(54) TAILORING THE GRAFTING DENSITY OF ORGANIC MODIFIERS AT SOLID/LIQUID INTERFACES

(75) Inventors: Jan Genzer; Kirill Efimenko, both of Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 09/736,675

(22) Filed: Dec. 13, 2000

(51) Int. Cl.$^7$ .......................... C23C 16/04; C23C 16/02
(52) U.S. Cl. ................. 427/250; 427/255.4; 427/255.6; 427/282; 427/299; 427/301; 427/307; 427/322; 427/553
(58) Field of Search .............................. 427/250, 255.4, 427/255.6, 282, 299, 301, 307, 322, 553

(56) References Cited

U.S. PATENT DOCUMENTS

| | | | |
|---|---|---|---|
| 5,512,131 A | 4/1996 | Kumar et al. | 156/655.1 |
| 5,661,092 A | 8/1997 | Koberstein et al. | 427/515 |
| 5,962,079 A | 10/1999 | Koberstein et al. | 427/508 |

OTHER PUBLICATIONS

Alexander; "Adsorption Of Chain Molecules With A Polar Head A Scaling Description," *Journal De Physique* 38:8 983–987 (Aug. 1977).
Andersson et al.; "Microtextured Surfaces: Towards Macrofouling Resistant Coatings," *Biofouling* 14(2):167–178 (1999).
Biesalski et al.; "Preparation And Characterization Of A Polyelectrolyte Monolayer Covalently Attached To A Planar Solid Surface," *Macromolecules* 32:7 2309–2316 (1999).
Bowden et al.; "Spontaneous Formation Of Ordered Structures In Thin Films Of Metals Supported On An Elastomeric Polymer," *Nature* 393:146–149 (May 1998).
Chaudhury et al.; Correlation Between Surface Free Energy And Surface Constitution, *Science* 255:1230–1232 (Mar. 1992).
Chaudhury; "Self–Assembled Monolayers On Polymer Surfaces," *Biosensor & Bioelectronics* 10:785–788 (1995).
Chaudbury; "Inferfacila Interaction Between Low–Energy Surfaces," *Materials Science and Engineering* R16:97–159 (1996).
Chaudbury; "Adhesion And Friction Of Self–Assembled Organic Monolayers," *Current Opinion in Colloid & Interface Science* 2:65–69 (1997).
Chidsey et al.; "Chemical Functionality In Self–Assembled Monolayers: Structural And Electrochemical Properties," *Langmuir* 6:3 682–691 (1990).
de Gennes; "Scaling Theory Of Polymer Adsorption," *Journal De Physics* 37:12 1445–1452 (Dec. 1976).
de Gennes; "Conformations Of Polymers Attached To An Interface," *Macromolecules* 13:5 1069–1075 (Sep.–Oct. 1980).

Ejaz et al.; "Controlled Graft Polymerization Of Methyl Methacrylate On Silicon Substrate By The Combined Use Of The Langmuir–Blodgett And Atom Transfer Radical Polymerization Techniques," *Macromolecules* 31:17 5934–5936 (1998).
Fischer et al.; "Functional Group Orientation In Surface And Bulk Polystyrene Studied By Ultra Soft X–Ray Absorption Spectroscopy," *Applied Surface Science* 133:58–64 (1998).
Fujiki et al.; "Radical Grafting From Glass Fiber Surface: Graft Polymerization Of Vinyl Monomers Initiated By Azo Groups Introduced Onto The Surface," *Journal of Polymer Science: Part A: Polymer Chemistry* 37:2121–2128 (1999).
Gaboury et al.; "Microwave Plasma Reactions Of Solid Monomers With Silicone Elastomer Surfaces: A Spectroscopic Study," *Langmuir* 9:11 3225–3233 (1993).
Genzer et al.; "Temperature Dependence Of Molecular Orientation On The Surfaces Of Semifluorinated Polymer Thin Films" *Langmuir* 16:4 1993–1997 (2000).
Genzer et al.; "The Orientation Of Semifluorinated Alkanes Attached To Polymers At The Surface Of Polymer Films" *Macromolecules* 33:5 1882–1887 (2000).
Genzer et al.; "Creating Long–Lived Superhydrophobic Polymer Surfaces Through Mechanically Assembled Monolayers," *Science* 290:2130–2133 (Dec. 2000).
Hillborg et al.; "Hydrophobicity Changes In Silicon Rubbers," *IEEE Transactions on Dielectrics and Electrical Insulation* 6:5 703–717 (Oct. 1999).
Huang et al.; "Surface–Confined Living Radical Polymerization for Coatings In Capillary Electrophoresis," *Anal. Chem.* 70:19 4023–4029 (Oct. 1998).
Huang et al.; "Make Ultrathin Films Using Surface–Confined Living Radical Polymerization," *Chemtech* 19–25 (Dec. 1998).
Huang et al.; "Surface Initiation Of Living Radical Polymerization For Growth Of Tethered Chains Of Low Polydispersity," *Macromolecules* 32:5 1694–1696 (1999).
Huck et al.; "Ordering Of Spontaneously Formed Buckles On Planar Surfaces," *Langmuir* 16:7 3497–3501 (2000).

(List continued on next page.)

*Primary Examiner*—Timothy Meeks
(74) *Attorney, Agent, or Firm*—Myers Bigel Sibley & Sajovec

(57) ABSTRACT

A method of depositing a functional group on a surface portion of an elastic substrate comprises the steps of:

(a) stretching an elastic substrate having an initial surface portion to form an enlarged surface portion from the initial surface portion; then (b) conjugating a functional group on the enlarged surface portion; and then (c) releasing the substrate to form a reduced surface portion from the enlarged surface portion, with the reduced surface portion having an area less than the enlarged surface portion, and with the reduced surface portion having the functional group deposited therein at a greater density than the enlarged surface portion.

38 Claims, 8 Drawing Sheets

OTHER PUBLICATIONS

Husseman et al.; "Controlled Synthesis Of Polymer Brushes By "Living" Free Radical Polymerization Techniques," *Macromolecules* 32:5 1424–1431 (1999).

Johnston et al.; "Networks From α,ω–Dihydroxypoly(Dimethylsiloxane) And (Tridecafluoro–1,1,2,2–Tetrahydrooctyl-)Triethoxysilane: Surface Microstructures And Surface Characterization," *Macromolecules* 32:24 8173–8182 (1999).

Kennan et al.; "Effect Of Saline Exposure On The Surface And Bulk Propeties Of Medical Grade Silicone Elastomers," *J Biomed Mater Res* 36:487–497 (1997).

Luzinov et al.; "Synthesis And Behavior Of The Polymer Covering On A Solid Surface. 3. Morphology And Mechanism Of Formation of Grafted Polystyrene Layers On The Glass Surface," *Macromolecules* 31:12 3945–3952 (1998).

Milner; "Polymer Brushes," *Science* 251:905–914 (Feb. 1991).

Minko et al., "Radical Polymerization Initiated From a Solid Substrate. 1. Theoretical Background," *Macromolecules* 32:14 4525–4531 (1999).

Minko et al.; "Radical Polymerization Initiated From A Solid Substrate. 2. Study of The Grafting Layer Growth On The Silica Surface By In Situ Ellipsometry," *Macromolecules* 32:14 4532–4538 (1999).

Ouyang et al.; "Conversion Of Some Siloxana Polymers To Silicon Oxide By UV–Ozone Photochemical Processes," *Chem. Mater.* 12:6 1591–1596 (2000).

Patten et al.; "Polymers With Very Low Polydispersities From Atom Transfer Radical Polymerization," *Science* 272:866–868 (May 1996).

Patten et al.; "Atom Transfer Radical Polymerization And The Synthesis Of Polymeric Materials," *Adv. Mater.* 10:12 901–915 (1998).

Prucker et al.; "Synthesis Of Poly(styrene) Monolayers Attached To High Surface Area Silica Gels Through Self–Assembled Monolayers Of Azo Initiators," *Macromolecules* 31:3 592–601 (1998).

Prucker et al.; "Polymer Layers Through Self–Assembled Monolayers Of Initiators," *Langmuir* 14:24 6893–6898 (1998).

Shah et al.; "Using Atom Transfer Radical Polymerization to Amplify Monolayers Of Initiators Patterned By Microcontact Printing Into Polymer Brushes For Pattern Transfer," *Macromolecules* 33:2 597–605 (2000).

Silver et al.; "Surface Properties And Hemocompatibility Of Alkyl–Siloxane Monolayers Supported On Silicone Rubber: Effect of Alkyl Chain Length And Ionic Functionality," *Biomaterials* 20: 1533–1543 (1999).

Stöhr et al.; "Monolayers Of Amphiphilic Block Copolymers Via Physisorbed Macroinitiators," *Macromolecules* 33:12 4501–4511 (2000).

Swalen et al.; "Molecular Monolayers and Films," *Langmuir* 3:6 932–950 (1987).

Tsubokawa et al.; "Effect Of Polymerization Conditions On The Molecular Weight Of Polystyrene Grafted Onto Silica In The Radical Graft Polymerization Initiated By Azo or Peroxyester Groups Introduced Onto The Surface," *Colloid & Polymer Science* 273:11 1049–1054 (1995).

Tsubokawa et al.; "Surface Grafting Of Polymers Onto Glass Plate: Polymerization Of Vinyl Monomers Initiated By Initiating Groups Introduced Onto The Surface," *J Appl Polym Sci* 65:2165–2172 (1997).

Urguhart et al.; "Core Excitation Spectroscopy Of Phenyl– And Methyl–Substituted Silanol, Disiloxane, And Disilane Compounds: Evidence For π–Delocalization Across The Si–$C_{phenyl}$ Bond," *Organometallics* 16:10 2080–2088 (1997).

Velten et al.; "Polymerization Of Sytrene With Peroxide Initiator Ionically Bound To High Surface Area Mica," *Macromolecules* 32:11 3590–3597 (1999).

von Werne et al.; "Preparation Of Structurally Well–Defined Polymer–Nanoparticle Hybrids With Controlled/Living Radical Polymerizations," *J. Am. Chem. Soc.* 121:32 7409–7410 (1999).

Wang et al.; "Liquid Crystalline, Semifluorinated Side Group Block Copolymers With Stable Low Energy Surfaces: Synthesis, Liquid Crystalline Structure, And Critical Surface Tension," *Macromolecules* 30:7 1906–1914 (1997).

Wasserman et al.; "Structure And Reactivity Of Alkylsiloxane Monolayers Formed By Reaction Of Alkyltrichlorosilanes On Silicon Substrates," *Langmuir* 5:4 1074–1087 (1989).

Yamamoto et al.; "Surface Interaction Forces Of Well–Defined, High–Density Polymer Brushes Studied by Atomic Force Microscopy. 1. Effect Of Chain Length," *Macromolecules* 33:15 5602–5607 (2000).

Zhao et al.; "Synthesis Of Tethered Polystyrene–block–Poly(methyl methacrylate) Monolayer On A Silicate Substrate By Sequential Carbocationic Polymerization And Atom Transfer Radical Polymerization," *J. Am. Chem. Soc.* 121:14 3557–3558 (1999).

a)

b)

c)

d)

e)

(a)

(b)

(c)

(d)

TAILORING THE GRAFTING DENSITY OF ORGANIC MODIFIERS AT SOLID/LIQUID INTERFACES

FIELD OF THE INVENTION

The invention generally relates to methods for modifying the surfaces of elastic substrates.

BACKGROUND OF THE INVENTION

It has now been established that the surface properties of materials (i.e., wetting, lubrication) can be successfully tailored by terminally attaching various organic modifiers. In particular, the deposition of self-assembled monolayers (SAMs) may offer one of the highest quality routes used to prepare chemically and structurally well-defined surfaces (A. Ulman, *An Introduction to Ultrathin Organic Films from Langmuir-Blodgett to Self Assembly* (Academic Press: New York, 1991); M. Chaudhury, *Mat. Sci. Eng. Rep.* 16, 97 (1996)).

One of the crucial issues concerning the application of SAMs is the knowledge of molecular level organization of the SAM chains. The wetting properties of SAMs and their stability are believed to be governed by the intimate interplay between the chemical nature of the terminus of the monolayer molecule ($\omega$-) and the packing within the SAM. The surface properties of the SAMs can range from hydrophobic to hydrophilic. The SAM packing in turn is believed to influences the two-dimensional arrangement of the $\omega$-functionalized surface groups. For example, it is believed that the degree of packing of the SAMs not only determines the surface energies of the SAMs, but ultimately influences the stability of the monolayer and its resistance against surface reconstruction (J. Wang, G. Mao, C. K. Ober, and E. J. Kramer, *Macromolecules* 30, 1906 (1997)). While the $\omega$-character is fixed by the chemical structure of the terminal group, the packing can be altered by varying the density of the grafting points at the surface. However, tailoring the grafting density of the SAM chains is typically not an easy task. Almost all SAMs are formed via natural self-assembly processes that are usually governed by the chemical and structural nature of the SAM molecules and the means of their attachment to the solid surface. However, when combined with mechanical manipulation, the grafting density and thus the chain packing can be altered.

SUMMARY OF THE INVENTION

In one aspect, the invention provides a method of depositing a functional group on a surface portion of an elastic substrate. The method comprises the steps of stretching an elastic substrate having an initial surface portion to form an enlarged surface portion from the initial surface portion, then conjugating a functional group on the enlarged surface portion, and then releasing the substrate to form a reduced surface portion from the enlarged surface portion. The reduced surface portion has an area less than the enlarged surface portion, and with the reduced surface portion having the functional group deposited therein at a greater density than the enlarged surface portion.

These and other aspects and advantages of the invention are described in greater detail herein.

DETAILED DESCRIPTION OF THE PREFERRED EMBODIMENTS

Figure 1:
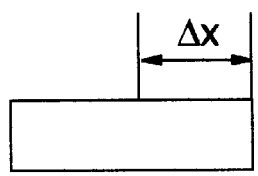
FIGS. 1a through e are schematic diagrams illustrating a method for producing an elastic material in accordance with the invention.
Figure 1:
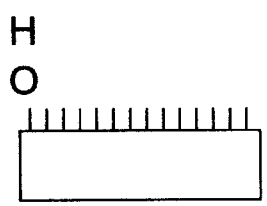
Figure 1:
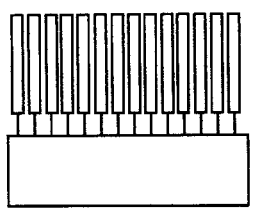

The invention will now be described in greater detail with respect to the preferred embodiments which follow, both in the specification and the drawings. It should be understood that these embodiments are for illustrative purposes only, and should be construed as limiting the scope of the invention as defined by the claims.

In one aspect, the invention relates to a method of depositing a functional group on a surface portion of an elastic substrate. The method comprises the steps of (a) stretching an elastic substrate having an initial surface portion to form an enlarged surface portion from the initial surface portion; then (b) conjugating a functional group on the enlarged surface portion; and then (c) releasing the substrate to form a reduced surface portion from the enlarged surface portion. The reduced surface portion has an area less than the enlarged surface portion, and the reduced surface portion has the functional group deposited thereon at a greater density than the enlarged surface portion.

The elastic substrate of the invention may be formed from a number of materials, the selection of which is known to one skilled in the art. In general, it is desirable that the material can physically or chemically be forced to reversibly (or partially reversibly) increase its surface area. For example, the elastic substrate may be formed from polymers (e.g., homopolymers, copolymers, and the like). Exemplary materials include, without limitation, siloxanes (e.g., poly (dimethylsiloxane) (PDMS), poly(hydromethylsiloxane), natural rubber, synthetic rubber, butadienes, and the like, as well as composites or combinations thereof. In various preferred embodiments, the elastic substrate is prepared by crosslinking the polymer and curing the crosslinked network to form a thermoset material. The crosslinking and curing may be carried out using techniques known to one skilled in the art.

In various preferred embodiments, the method of the invention further comprises the step of subjecting the enlarged surface portion of the elastic substrate to conditions sufficient to impart hydrophilicity thereto, with this subjecting step occurring subsequent to step (a) and prior to step (b). In one embodiment, for example, the subjecting step comprises exposing the enlarged surface portion to a ozone treatment to form a reactive group on the enlarged surface portion. Preferably, the ozone treatment is used in conjunction with an ultraviolet treatment. Ozone-treatment techniques are known in the art, and are described for example in U.S. Pat. Nos. 5,661,092 to Koberstein et al. and 5,962,079 to Koberstein et al., the disclosures of which are incorporated herein by reference in their entirety. The reactive group, which results on the substrate surface, is preferably one or more of a hydroxyl group, a carboxyl group, and a peroxide group.

A wide variety of functional groups may be employed in the conjugating step of the invention, the selection of which is known to one skilled in the art. Preferably, the conjugating step comprises depositing a functional group on the enlarged surface portion to react with the reactive group to chemically modify the reactive group, i.e., a chain is formed on the substrate. In general, the chain may be in the form of a monomer, oligomer, or polymer (e.g., homopolymer, copolymer, terpolymer, etc.) In one embodiment, these chains are present in the form of a monolayer, although other configurations may be formed by one who is skilled in the art. In such embodiments, the invention provides for the fabrication of mechanically assembled molecules (hereinafter "MAMs"). In embodiments, in which polymers are assembled on the substrate, the fabrication is referred to as mechanically assisted polymer assembly. In preferred embodiments, the finctional group may be selected from an aryl-containing group (e.g., a chloro group such as 1-trichlorosilyl-2-(m-p-chloromethyl-phenyl)ethane), SH, $M-SiCl_3$, $M-SiCl_2(OR)$, $M-SiCl(OR)_2$, and combinations thereof. Polyacrylamide chains may be formed on the substrate. M is preferably represented as $F(CF_2)_{y1}(CH_2)_{x1}$, In these groups, x1 and y1 are individually selected and each preferably ranges from 1 to 8, 25, 50, 100, or a 1000 including all values therebetween. X1 is most preferably 2 and y1 most preferably ranges from 6 to 8. M which contains fluorine-based molecules may also encompass other materials such as those described in U.S. Pat. No. 5,863,612 to DeSimone, the disclosure of which is incorporated herein by reference in its entirety. Such fluorinated materials include, without limitation, fluoroacrylates, fluoroolefins, fluorostyrenes, fluoroalkylene oxides, fluorinated vinyl alkyl ethers, and combinations thereof. In addition, M can be any other chemical functionality of the following formula including, without limitation, ω-R-, where ω is a functional terminus, such as $—CH_3$, $—CF_3$, $—NH_2$, $—COOH$, $—SH$, $—CH=CH_2$, and others, and wherein R is a hydrocarbon chain which may be branched or unbranched and/or substituted or unsubstituted. The hydrocarbon chain preferably has 1 to 100,000 repeating units, and encompass all values therebetween.

Not intending to be bound by theory, it is believed that the formation of certain embodiments of functional groups may be illustrated by the following reaction schemes (1) and (2):

Reaction Scheme (1)

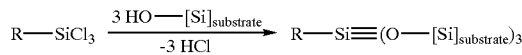

wherein R is defined above.

Reaction Scheme (2)

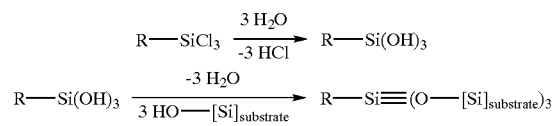

The chain may be formed by growing the functional group, which has been deposited on the substrate, or as described herein, by grafting the functional group on to the substrate and using it as an initiator for polymerization (so called "grafting from"). In a specific embodiment, the group M referred to above serves as a polymerization free radical or controlled radical initiator and the method comprises grafting the group M onto the substrate to attach the molecules thereto, i.e., form molecular "brushes" on the substrate. The "brushes" may exist in the form of oligomers or polymers.

The brush graft density of molecules at the surface of the substrate may be controlled by varying any of a number of process variables such as, for example, the time of ozone treatment (i.e., $\tau_{UVO}$), initiator deposition time (i.e., $\tau_M$), initiator concentration (i.e., $C_M$). Various brush graft densities may be obtained for the purposes of the invention. Preferably, the brush graft density ranges from about $10^{14}$ molecules/mm$^2$ to about $10^{15}$ or $10^{16}$ molecules/mm$^2$. In another embodiment, the brush graft density may be no greater than about $10^{16}$ molecules/mm$^2$.

In other embodiments, biological materials may be attached to the surface of the elastic substrate. Accordingly, any number of complementary finctional groups may be attached thereto as desired by the skilled artisan such as, for example, oligonucleotides (e.g., DNA, RNA), proteins, peptides, and antibodies. For example, one can tether a polypeptide molecule composed of a defined sequence of amino acids to the substrate. The attachment may be accomplished as set forth generally by embodiments described herein, for example, by anchoring the peptide molecule from the solution or by growing the peptide by the "grafting from" reaction.

In embodiments which employ SH as the functional group, the surface of the elastic substrate typically comprises at least one metal thereon which is compatible with this group. Preferred metals include, without limitation, gold, silver, platinum, palladium, alloys thereof, and combinations thereof. In general, the functional group may be a monomer, oliogomer, homopolymer, copolymer, and the like.

Subsequent to the step of conjugating a functional group on the enlarged surface portion of the substrate, the substrate is released forming a reduced surface portion from the enlarged surface portion. The reduced surface portion may be of various sizes. In one embodiment, for example, the area of the reduced surface portion and the area of the initial surface portion are the same. In another embodiment, the area of the reduced surface portion and the area of the initial surface portion differ by not more than five percent. In another embodiment, the area of the reduced surface portion is at least 10 percent less than the area of the enlarged surface portion. In another embodiment, the area of the reduced surface portion is at least 20 percent less than the area of the enlarged surface portion.

The density of functional groups reacted to the reacted groups (i.e., molecules) on the released elastic substrate can vary. In one embodiment the density ranges from $10^{14}$ molecules/mm$^2$ to $10^{15}$ or $10^{16}$ molecules/mm$^2$. Preferably, the released elastic substrate contains no greater than $10^{16}$ molecules/mm². In general, for various embodiments described herein, the groups (i.e., chains) extending from the released elastic substrate are typically aligned so as to be present as a closely packed array.

The methods of the invention may be carried out using known equipment. In one embodiment for example, the substrate (e.g., film) is crosslinked and cured as alluded to above. The film is then placed into a suitable apparatus and is mechanically stretched by a predetermined distance along the length of the film. The film may either be stretched uni-axially or bi-axially along the longitudinal axis of the film, as selected by one skilled in the art. In accordance with the invention, it is preferred that the stretching be carried out within the region when Hook's law is valid. It is preferred that the relative strain (hereinafter represented by "Δx") not exceed 50 percent of the initial film length. Other means of stretching may be employed as known by one who is skilled in the art.

Figure 2:
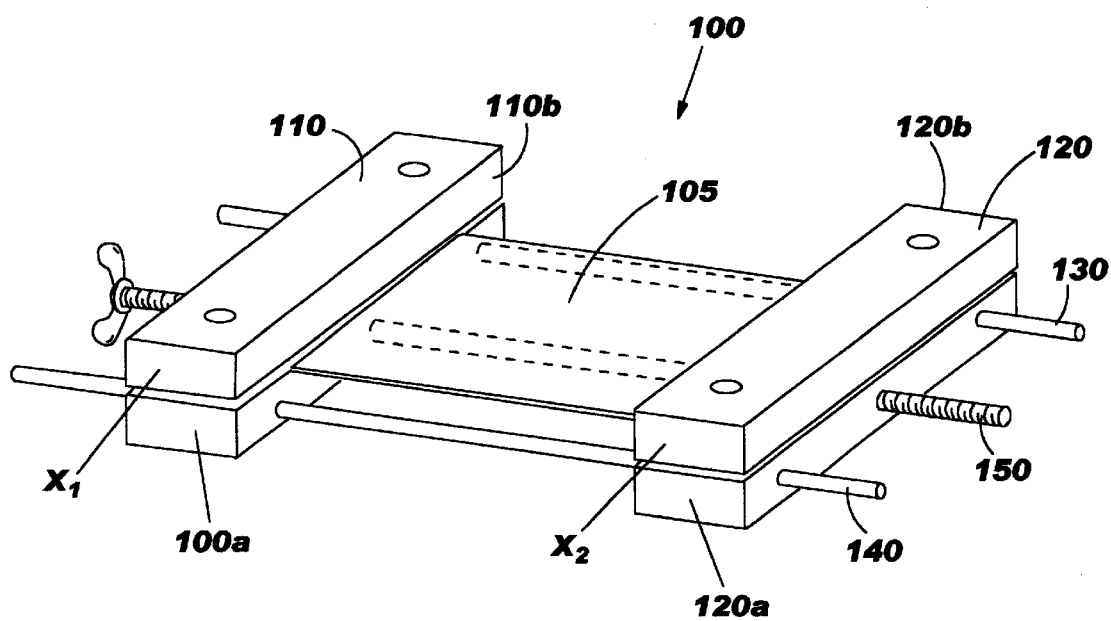
FIG. 2 is a schematic illustrating an apparatus for preparing elastic substrates in accordance with the invention.

FIG. 2 illustrates an apparatus 100 for mechanically stretching the substrate (e.g., film) 105. It should be appreciated that other equipment may be used without departing from the scope of the invention. The apparatus is made from a pair of parallel plate structures 110 and 120 each having bottom plates 110a and 120a and top plates 110b and 120b respectively which are clamped such that the film 105 is fit snugly therebetween. As depicted in FIG. 2, the film to be stretched is positioned perpendicular to the longitudinal axes x1 and x2 of each of structures 110 and 120 and between each of the bottom and top plates. Rods 130 and 140 extend through each of the bottom plates 110a and 120a and extend parallel to the longitudinal axis of the film. A threaded member 150 is also present in between the rods and extends parallel to the rods 130 and 140. In this embodiment, one-half of the length of the threaded member 150 is right-threaded and the other half is left-threaded. Accordingly, by rotating the threaded member 150 in one direction, one is able to extend the rods 130 and 140 and thus stretch the film 105. Conversely, by rotating the threaded member 150 in the other direction, one is able to bring the rods 130 and 140 inward, thus releasing the film 105.

In another embodiment, it is possible to stretch the substrate without employing a mechanical force. More specifically, it is believed that one can contact the substrate with a liquid, which causes a swelling in the area of the substrate. In one example, toluene may be employed to swell a PDMS substrate. In another example, a hydrolyzed poly (hydromethylsiloxane) substrate is exposed to a fluid (e.g., supercritical carbon dioxide) to effect the swelling of the substrate. Other embodiments are encompassed by the invention.

Subsequent to stretching the elastic substrate, a reactive group is imparted to the substrate surface in the manner described herein. Thereafter, a functional group is deposited on the substrate, which reacts with the reactive group to chemically modify the reactive group and form a chain on the substrate surface. This deposition can be carried out using processes known to one skilled in the art. In one embodiment, the functional groups may be deposited by employing a vapor deposition. As an example, the vapor deposition may be used in conjunction with a mask comprising openings contained in a regular or non-regular pattern. For example, the pattern can be composed of a single "hole" (or a rectangle/square/triangle, etc.) or can be made of an array of the same patterns mentioned above or any combination of those patterns. Other patterns can also be employed. As such, the mask allows for certain regions of the substrate to have chains formed thereon in accordance with the invention (i.e., an unmasked region), and not have chains formed thereon (i.e., a masked region). In one embodiment, the mask may consist of parallel grooves so as to allow for the fabrication of a sinusoidal wetting profile on the elastic substrate. The parameters of such a profile may be customized as deemed appropriate by one skilled in the art such as, for example, by adjusting the distance from the mask to the elastic substrate (e.g., a "shadowing effect"), varying the width of the mask grooves, and adjusting Δx.

Figure 9:
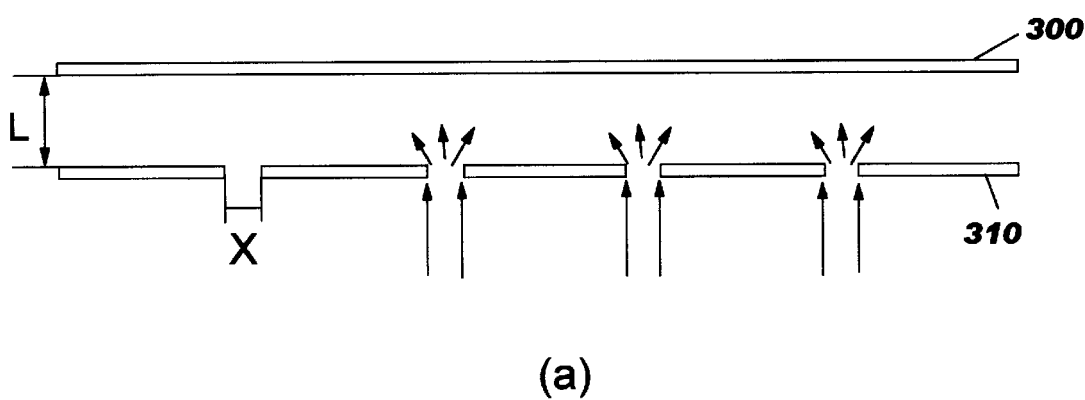
FIGS. 9a through 9d illustrate different configurations for employing a mask in forming a substrate in accordance with the invention.
Figure 9:
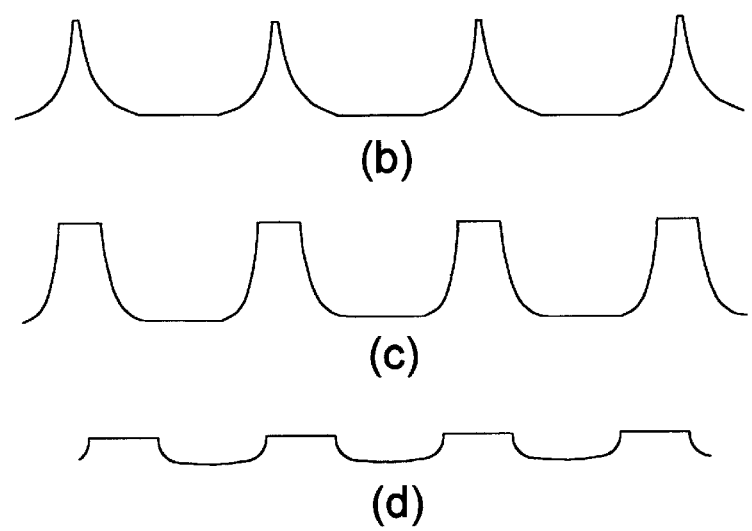

FIGS. 9a through 9d illustrate various configurations that may be employed in producing a shadow effect alluded to above. FIG. 9a illustrates a mask 310 having holes therein each of opening width X being positioned at a distance L from the substrate 300. FIG. 9b illustrates an effect when X is much less than L. FIG. 9c illustrates an effect when X is approximately equal to L. FIG. 9d illustrates an effect when X is greater than L.

The invention offers a number of advantages. For example, the elastic substrate may have certain tuned wettable properties by adjusting, for example, Δx and M (i.e., initiator as defined herein). These wettable properties may be either hydrophilic or hydrophobic. In certain embodiments, the wettable properties of the elastic substrate (after release) may be such that the water contact angle ranges from 20° to 140°. Moreover, by adjusting Δx, the elastic substrate may have certain tuned barrier properties. The molecular mobility of the surface chains (functional groups) may be controlled by adjusting the rate of strain release. Although not intending to be bound by theory, at small release rates one potentially expects the molecules to have enough time to respond to the mechanical manipulation, at higher release rates chain interlocking ("entanglement") may possibly lead to irregular structures. Additionally, the released elastic substrate may possess long-lasting (non-reconstructive) wetting properties, i.e., the surface energy of the released elastic substrate remains constant for up to or at least six months subsequent to the formation of the substrate. The surface tension of the released elastic substrate may also be adjusted as deemed appropriate by one skilled in the art. For example, the released elastic substrate may preferably have a surface tension ranging from about 6 or 9 mJ/m² to about 11 to 13 mJ/m². In certain embodiments, the substrate may have a critical surface tension of as low as 6 mJ/m² (e.g., a crystalline array of $CF_3$ groups). The surface tension of the elastic substrate is believed to vary according to the type of molecule chain(a) attached thereto.

In summary, the following elastic substrate properties, without limitation, may be modified: surface energy, surface permeability, surface weatherability, surface chemical pattern, surface resistance to liquids of varying pHs (e.g., acids and bases), and surface hardness. The substrates can also serve as flexible protection materials, as well as antifouling non-reconstructive surfaces and active filters for gases and liquids. The substrates (particularly in the form of films) also are capable of being attached to other materials through its non-modified side. Such surfaces can be applied to any surface that needs to be modified, i.e., function as a sticker or a "Post-It®-type" surface.

The invention will now be described according to the examples, which follow. It should be appreciated that the examples are set forth for the purposes of illustrating the invention and are not intended to limit the scope of the invention as set forth by the claims.

EXAMPLE 1

PDMS Film Formation

FIG. 1 illustrates a process for forming an elastic substrate in accordance with the invention. A PDMS networked film (e.g., Sylgard® 184 made commercially available from Dow Chemical Company of Midland, Mich.) is prepared by casting a mixture of PDMS and a crosslinker (curing agent 184 made commercially available from Dow Chemical Company) in a ratio of 10:1 (PDMS to curing agent). The PDMS is formed into a 0.5 mm thick film and is thereafter cured at 55° C. for about 1 hour (see FIG. 1a).

In the second step, the PDMS film is cut into small strips (ca. 1×5 cm²) and stretched as illustrated by FIG. 1b by the apparatus depicted in FIG. 2. In the subsequent step, the stretched substrate is exposed to a UV ozone (UVO) treatment to produce —OH functionalities as shown in FIG. 1c.

Next, chlorosilane molecules are deposited from a vapor phase on the stretched substrate (see FIG. 1d) and upon deposition form an organized self-assembled monolayer (SAM). The vapor deposition is carried out in an evacuated container having a pressure approximately ranging of from about $10^{-3}$ to $10^{-4}$ torr. The sample is placed upside down above the diffusion source comprising a mixture of chlorosilane and a paraffin oil. It is preferred that the paraffin oil and chlorosilane molecule do not mix so as to serve as a "carrier" medium for the diffusion source. The concentration of the diffusion source can be readily adjusted by varying the chlorosilane:paraffin oil ratio.

In the final step, the strain is released from the stretched substrate. In this particular embodiment, the PDMS film, covered by a thin SAM layer, returns to its original size (see FIG. 1e) and the grafted molecules form a highly dense organized surface layer.

In this embodiment, the chlorosilane molecules are grafted on to the substrate according to the following reaction scheme:

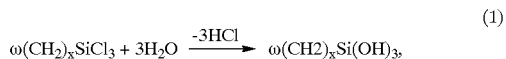

(1)

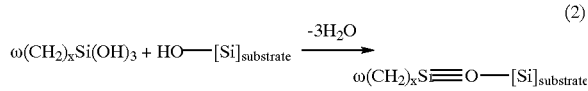

(2)

EXAMPLE 2

Water Contact Angle Measurement for PDMS Films

Water contact angles ($\theta_{H2O}$) were measured for various PDMS films which have undergone various levels of stretching (expressed by $\Delta x$) and various exposure times ($T_{UVO}$). The results are set forth in Table 1. As shown therein, the hydrophilicity of the PDMS surface increases with increasing $\Delta x$.

TABLE I

Water contact angle ($\theta_{H2O}$) of
PDMS films stretched to strains $\Delta x$ and
exposed to UVO for times $\tau_{UVO}$

| $\Delta x$ (%) | 0 | 20 | 50 |
|---|---|---|---|
| $\tau_{UVO}$ (min) | 0 | 20 | 20 |
| $\theta_{H2O}$ (deg) | 108 | 81.5 | 71.1 |

EXAMPLE 3

Water Contact Angle Measurement for PDMS Films

Figure 3:
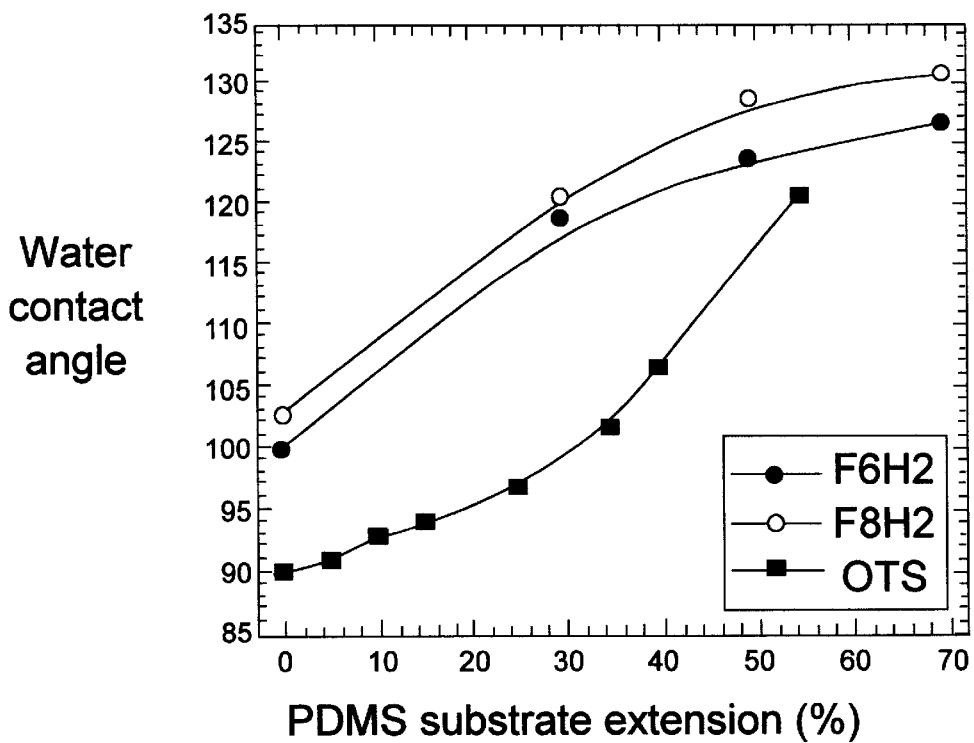
FIG. 3 illustrates water contact angle data for SAMs for F6H2, F8H2 and OTS attached to stretched PDMS network substrates plotted as a function of the relative extension of the PDMS substrates.

Water contact angles were measured for various PDMS films stretched at different levels and having various functional groups formed thereon. In this example, F6H2 refers to $F(CF_2)_6(CH_2)_2SiCl_3$, F8H2 refers to $F(CF_2)_8(CH_2)_2SiCl_3$, and OTS refers to $H(CF_2)_8SiCl_3$. The results are depicted in FIG. 3. As illustrated, the sample contact angle increases with the level of stretching. The data also suggest that water contact angle increases with increasing $CF_2$ length. Without intending to be bound by theory, it is believed that the functional group chains are well aligned and the surfaces of F6H2 and F8H2 consist of ordered arrays of —$F_3$.

EXAMPLE 4

PDMS Surface Structure as a Function of Strain Release Rate

Figure 4:
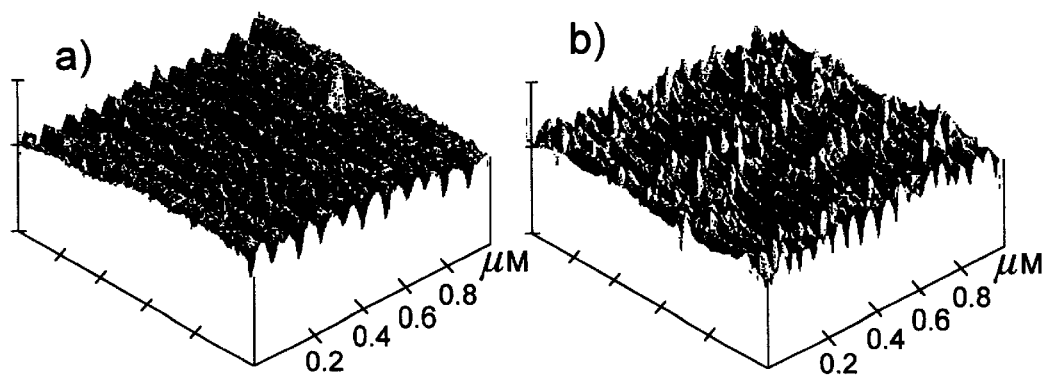
FIGS. 4a and 4b illustrate atomic force microscopy images of the surfaces of F8H2 samples after the strain on the surface (initially $\Delta x=50\%$) has been released a) slowly (over a period of 3 hours) and b) quickly (immediate strain release).

FIGS. 4a and 4b illustrate atomic force microscopy images of PDMS samples functionalized with F8H2 in which the initial strain ($\Delta x$) was 50 percent. FIG. 4a illustrates the strain being released slowly, i.e., over a period of approximately 3 hours and FIG. 4b illustrates the strain being released immediately. As shown from these photographs, the release rate of the strain influences final topography of the film surface.

EXAMPLE 5

Contact Angle Hysteresis

Figure 5:
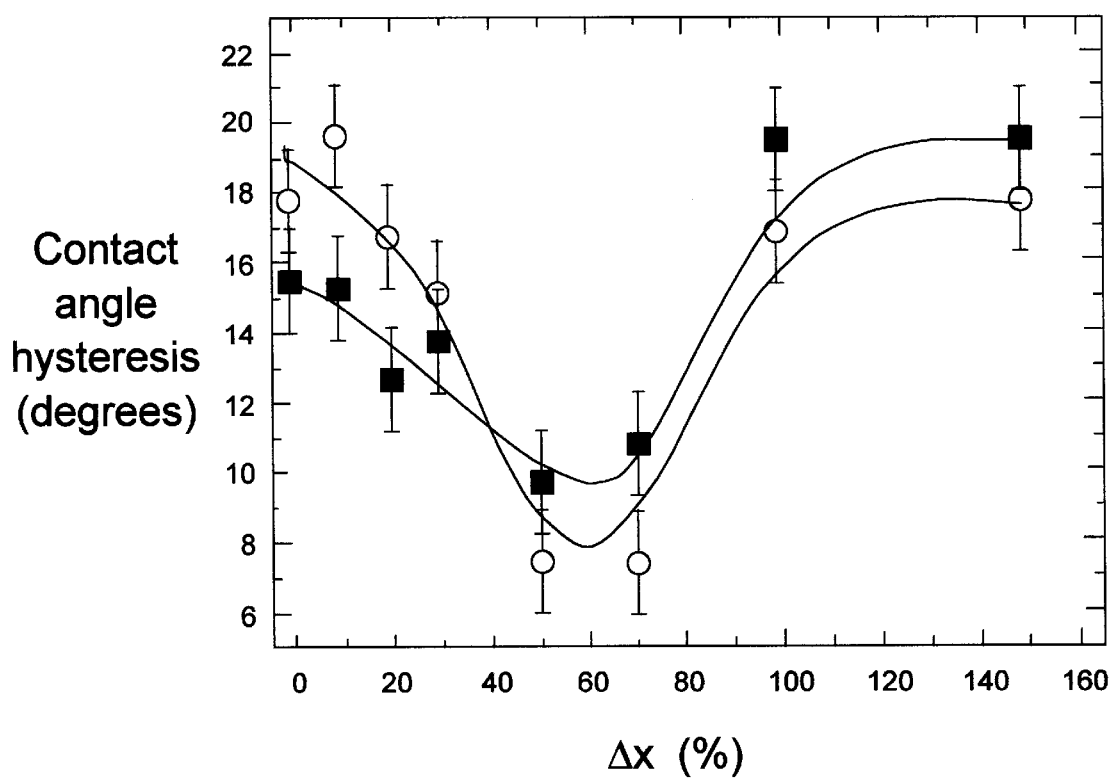
FIG. 5 illustrates the contact angle hysteresis for various PDMS samples.

FIG. 5 illustrates the contact angle hysteresis for PDMS samples finctionalized by F6H2 (circles) and F8H2-MAM (squares) as a function of $\Delta x$. In this embodiment, contact angle hysteresis is defined as the difference between the advancing and receding water contact angles.

EXAMPLE 6

Relationship of Water Contact Angle to Water Exposure

Figure 6:
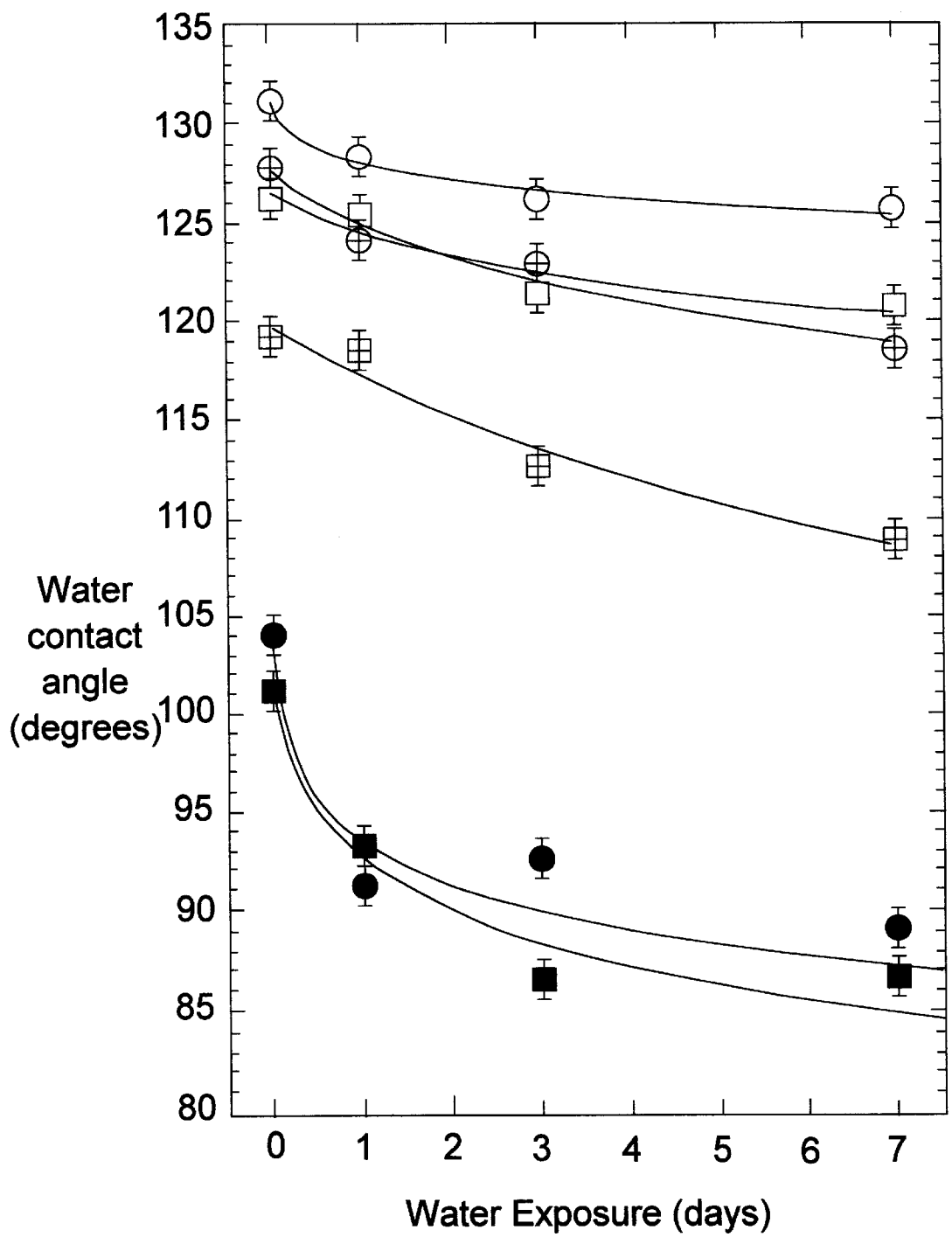
FIG. 6 illustrates the dependence of water contact angle of F6H2-MAM (squares) and F8H2-MAM (circles) on exposure time to water.

FIG. 6 illustrates the dependence of water contact angle of F6H2-MAM (squares) and F8H2-MAM (circles) on exposure time to water. The solid symbols denote the contact angles measured on FyH2-MAMs with $\Delta x=0\%$. The open symbols denote the contact angles measured on FyH2-MAMs with $\Delta x=70\%$ taken immediately after the water exposure and substrate drying with nitrogen. The crossed symbols represent the contact angles from the samples denoted by the open symbols measured six months later in time. These samples were stored under ambient conditions with no temperature or humidity control between water exposure and measurement. As shown, the substrates display comparable surface properties long after being formed.

EXAMPLE 7

Relationship of Water Contact Angle to Water Exposure

Figure 7:
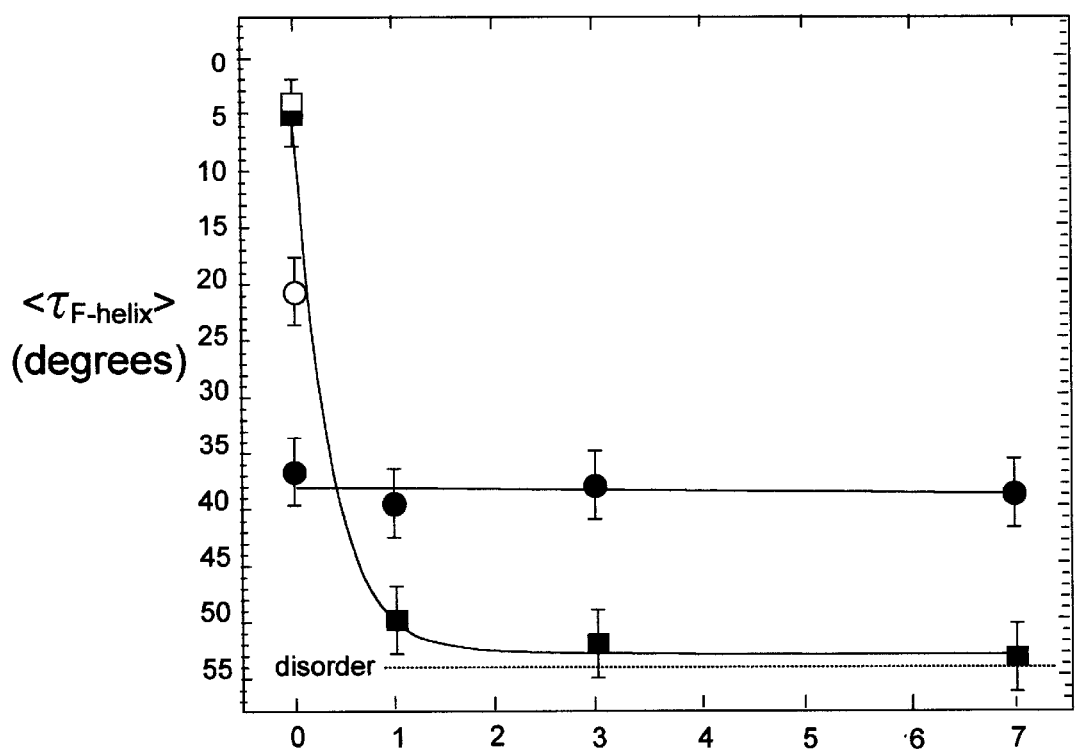
FIG. 7 illustrates the dependence of the average tilt angle of the fluorinated helix<$\tau_{F-helix}$>in F8H2-MAMs on the exposure time of the F8H2-MAM to water.

FIG. 7 illustrates the dependence of the average tilt angle of the fluorinated helix<$\tau_{F-helix}$> for F8H2-MAMs to the exposure time of the F8H2-MAM in water. The squares and circles denote <$\tau_{F-helix}$> in F8H2-MAM ($\Delta x=0\%$) and F8H2-MAM ($\Delta x=70\%$) samples, respectively. The solid and open symbols represent <$\tau_{F-helix}$> measured along and perpendicular to, respectively, the stretching direction. The dashed line marks the value of <$\tau_{F-helix}$> corresponding to a completely disoriented MAM.

EXAMPLE 8

Formation of poly(acrylamide) Chains on a PDMS Substrate

Figure 8:
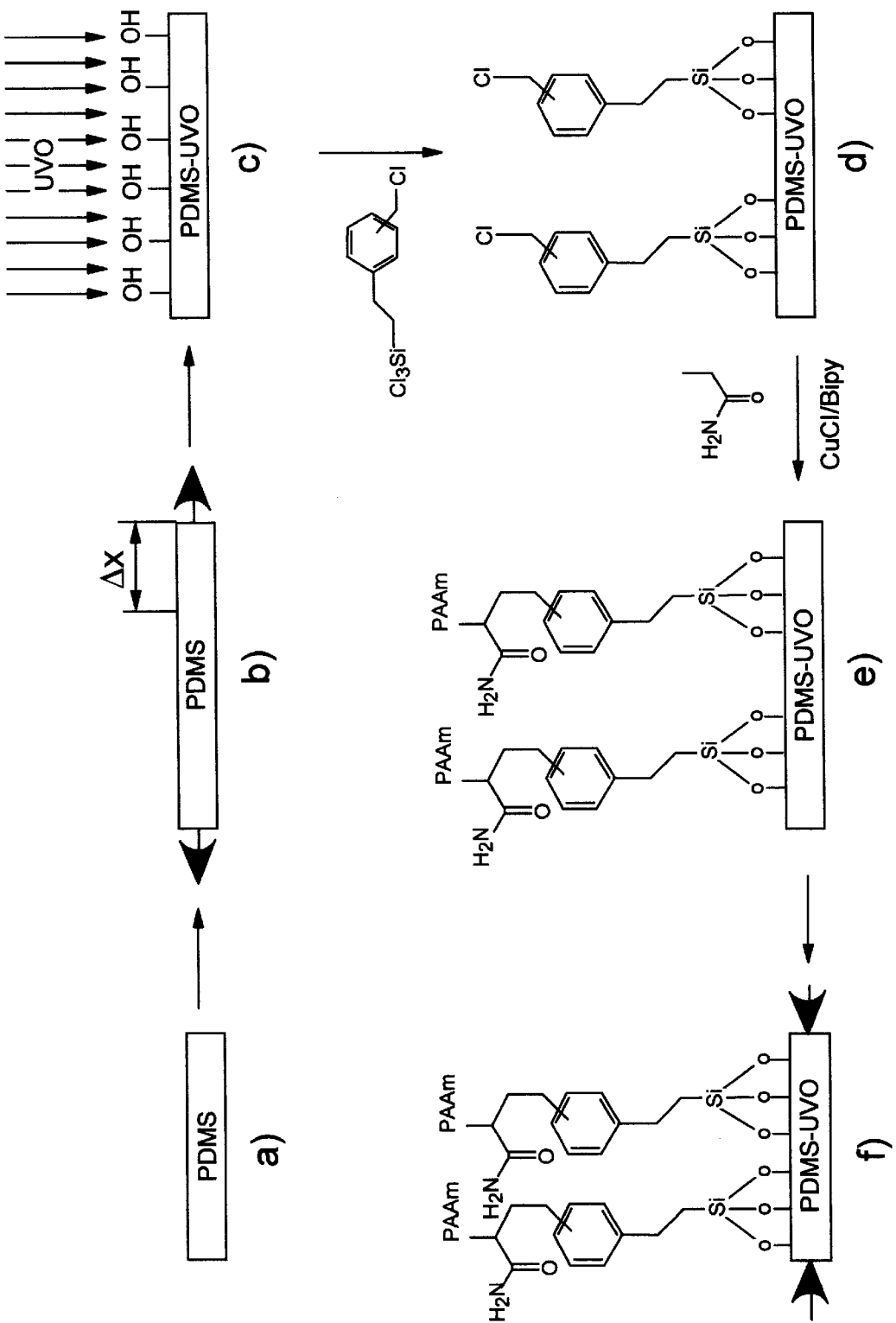
FIGS. 8a through 8f are schematic diagrams illustrating a method for producing an elastic material brushed with poly(acrylamide).

A pristine PDMS network film is prepared by casting a mixture of PDMS and a crosslinker according to the procedure set forth in Example 1. The mixture is formed into thin (approximately 1 mm) film and cured for approximately one hour (see FIG. 8a). The cured film is then cut into strips (approximately 1×5 cm²) and mechanically elongated by Δx as shown in FIG. 8b. The film is subsequently exposed to a UV/ozone treatment (FIG. 8c) producing a hydrophilic surface primarily comprising hydroxy groups which served as attachment points for the chloro-silane ATRP (atom transfer radial polymerization) initiators. 1-trichloro-2-(m-p-chloromethylphenyl)ethane (CMPE) is employed as an initiator and is made commercially available by United Chemical Technologies, Inc. of Bristol, Pa. The CMPE molecules are deposited from vapor onto the stretched substrate and form an organized CMPE-self assembled monolayer, which is depicted in FIG. 8d.

After the CMPE-SAM deposition, physisorbed CMPE molecules are removed by thoroughly washing the substrates with warm deionized water (75° C., >16 MΩ.m) for several minutes. The film is placed into 120 mL of N, N'-dimethylformamide in a flash, and 0.3 g of CuCl, 1.0 g of bipyridine, and 16.0 g of acrylamide (all made commercially available by Aldrich Chemical of Milwaukee, Wis.) are added thereto. The chemistry is described in Huang et al., *Chemtech*, December 1998. Huang et al.,*Anal. Chem.* 1998, 70, 4023, and Huang et al.,*Macromolecules* 1999, 32, 1694. The flask was then sealed under nitrogen, placed into an oil bath, and the mixture was reacted at 130° C. for 45 hours to form poly(acrylamide) (PAAm) brushes on the PDMS-ultraviolet-ozone treated (i.e., UVO) substrate as illustrated in FIG. 8e. After the reaction, the strain is released from the PDMS-UVO substrate such that it returns to its initial size causing the grafted PAAm polymers to form a densely organized brush, which is depicted in FIG. 8f. Physisorbed monomeric and polymeric acrylamide was removed by soxlet extraction with deionized water for 48 hours.

EXAMPLE 9

Formation of Hydrolyzed PDMS Substrate

A substrate formed from poly(hydromethyl) siloxane is reacted with a divinyl compound over a platinum catalyst to form an H-PDMS network. The reaction proceeds according to the following scheme:

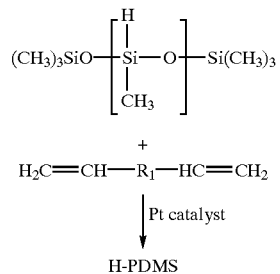

The H-PDMS substrate is thereafter exposed to supercritical carbon dioxide (sc-$CO_2$); increasing the pressure of the sc-$CO_2$ causes the substrate to swell. The H-PDMS substrate is then exposed to water vapor over a tin catalyst to hydrolyze the H-PDMS substrate according to the following reaction scheme:

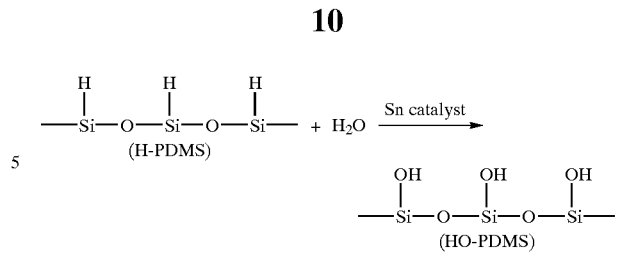

The HO-PDMS substrate is thereafter exposed to functional groups described herein to form chains extending from the substrate. Finally, the supercritical carbon dioxide is depressurized to relax the substrate, i.e., the swelled network relaxes back causing the grafted molecules to pack densely.

The present invention has been described with respect to the embodiments set forth above. It should be appreciated that these embodiments are for the purposes of illustrating the invention, and do not limit the scope of the invention as defined by the claims.

That which is claimed is:

1. A method of depositing a functional group on a surface portion of an elastic substrate, comprising the steps of:
   (a) stretching an elastic substrate having an initial surface portion to form an enlarged surface portion from said initial surface portion; then
   (b) conjugating a finctional group on said enlarged surface portion; and then
   (c) releasing said substrate to form a reduced surface portion from said enlarged surface portion, with said reduced surface portion having an area less than said enlarged surface portion, and with said reduced surface portion having said functional group deposited therein at a greater density than said enlarged surface portion.

2. A method according to claim 1, wherein said functional group is conjugated as a monolayer on said enlarged surface portion.

3. A method according to claim 1, wherein the area of said reduced surface portion and the area of said initial surface portion are the same.

4. A method according to claim 1, wherein the area of said reduced surface portion and the area of said initial surface portion differ by not more than five percent.

5. A method according to claim 1, wherein the area of said reduced surface portion is at least 10 percent less than the area of said enlarged surface portion.

6. A method according to claim 1, wherein the area of said reduced surface portion is at least 20 percent less than the area of said enlarged surface portion.

7. A method according to claim 1, wherein said conjugating step is carried out by grafting said functional group to said enlarged surface portion.

8. A method according to claim 1, wherein said functional group is a polymer or a copolymer.

9. A method according to claim 1, wherein said conjugating step is carried out by growing said functional group on said enlarged surface portion.

10. A method according to claim 1, wherein said elastic substrate comprises poly(dimethyl siloxane).

11. A method according to claim 1, wherein said elastic substrate comprises a component selected from the group consisting of natural rubber, synthetic rubber, butadienes, and combinations thereof.

12. A method according to claim 1, wherein said stretching step comprises mechanically stretching the substrate uni-axially.

13. A method according to claim 1, wherein said stretching step comprises mechanically stretching the substrate bi-axially.

14. A method according to claim 1, further comprising the step of subjecting the enlarged surface portion of said elastic substrate to conditions sufficient to impart hydrophilicity thereto, wherein said subjecting step occurs subsequent to step (a) and prior to step (b).

15. A method according to claim 14, wherein said subjecting step comprises exposing the enlarged surface portion to an ozone treatment to form a reactive group on the enlarged surface portion, said reactive group selected from the group consisting of a hydroxyl group, a carboxyl group, a peroxide group, and combinations thereof.

16. A method according to claim 15, wherein said conjugating step comprises depositing a functional group on the enlarged surface portion to react with the reactive group to chemically modify the reactive group, the functional group being selected from the group consisting of SH, M-SiCl$_3$, M-SiCl$_2$(OR), M-SiCl(OR)$_2$, and combinations thereof, wherein M is selected from an aryl-containing group or F(CF$_2$)$_{y1}$(CH$_2$)$_{x1}$, or combinations thereof, wherein x1 ranges from 1 to 1,000 and y1 ranges from 1 to 1,000, and wherein R is a hydrocarbon chain.

17. A method according to claim 16, wherein the functional group is SH and the enlarged surface portion comprises a metal selected from the group consisting of gold, silver, copper, platinum, palladium, alloys thereof, and combinations thereof.

18. A method according to claim 16, wherein said depositing is a vapor deposition.

19. A method according to claim 18, wherein said vapor deposition is carried out through a mask present on top of said enlarged surface portion, said mask having a plurality of openings.

20. A method according to claim 19, wherein the mask openings are arranged in a regular pattern.

21. A method according to claim 19, wherein the mask openings are arranged in a non-regular pattern.

22. A method according to claim 1, wherein the enlarged surface portion comprises a protein molecule.

23. A method according to claim 1, wherein the elastic substrate comprises poly(hydromethylsiloxane) and said step of stretching the elastic substrate comprises exposing the substrate to pressurized supercritical carbon dioxide to swell the substrate and said releasing step comprises depressurizing the supercritical dioxide to relax the substrate.

24. A method of depositing a functional group on a surface portion of an elastic substrate, comprising the steps of:

(a) stretching an elastic substrate having an initial surface portion to form an enlarged surface portion from said initial surface portion, the elastic substrate comprising poly(dimethyl siloxane); then (b) exposing the enlarged surface portion to a treatment to form a reactive group on the enlarged surface portion, said reactive group selected from the group consisting of a hydroxyl group, a carboxyl group, a peroxide group, and combinations thereof; then (c) depositing a functional group as a monolayer on the enlarged surface portion to react with the reactive group and chemically modify the enlarged surface portion, the finctional group being selected from the group consisting of M-SiCl$_3$, M-SiCl$_2$(OR), M-SiCl(OR)$_2$, and combinations thereof, wherein M is selected from an aryl-containing group, F(CF$_2$)$_{y1}$(CH$_2$)$_{x1}$, or combinations thereof, wherein x1 ranges from 1 to 1,000 and y1 ranges from 1 to 1,000, and wherein R is a hydrocarbon group; and then (d) releasing said substrate to form a reduced surface portion from said enlarged surface portion, with said reduced surface portion having an area less than said enlarged surface portion, and with said reduced surface portion having said functional group deposited therein at a greater density than said enlarged surface portion.

25. A method according to claim 24, wherein the area of said reduced surface portion and the area of said initial surface portion are the same.

26. A method according to claim 24, wherein the area of said reduced surface portion and the area of said initial surface portion differ by not more than five percent.

27. A method according to claim 24, wherein the area of said reduced surface portion is at least 10 percent less than the area of said enlarged surface portion.

28. A method according to claim 24, wherein the area of said reduced surface portion is at least 20 percent less than the area of said enlarged surface portion.

29. A method according to claim 24, wherein said exposing step comprises grafting said functional group to said enlarged surface portion.

30. A method according to claim 24, wherein said functional group is a polymer or a copolymer.

31. A method according to claim 24, wherein said exposing step comprises growing said functional group on said enlarged surface portion.

32. A method according to claim 24, wherein said stretching step comprises mechanically stretching the substrate uni-axially.

33. A method according to claim 24, wherein said stretching step comprises mechanically stretching the substrate bi-axially.

34. A method according to claim 24, wherein said exposing step comprises exposing the enlarged surface portion to an ozone treatment.

35. A method according to claim 24, wherein said depositing is a vapor deposition.

36. A method according to claim 35, wherein said vapor deposition is carried out through a mask present on top of said enlarged surface portion, said mask having a plurality of openings.

37. A method according to claim 36, wherein the mask openings are arranged in a regular pattern.

38. A method according to claim 36, wherein the mask openings are arranged in a non-regular pattern.

* * * * *

UNITED STATES PATENT AND TRADEMARK OFFICE
CERTIFICATE OF CORRECTION

PATENT NO. : 6,423,372 B1
DATED : July 23, 2002
INVENTOR(S) : Genzer et al.

It is certified that error appears in the above-identified patent and that said Letters Patent is hereby corrected as shown below:

Column 8,
Line 10, should read -- of $^-CF_3$. --

Column 10,
Line 28, should read -- (b) conjugating a functional group on said enlarged surface --

Signed and Sealed this

Eleventh Day of February, 2003

JAMES E. ROGAN
*Director of the United States Patent and Trademark Office*